United States Patent
Flynn et al.

[19]

[11] Patent Number: 6,113,838
[45] Date of Patent: Sep. 5, 2000

[54] CONTROL OF METALLIC APPEARANCE IN AUTOMOTIVE CAST PAINT FILMS

[75] Inventors: Michael D. Flynn, Oak Forest, Ill.; Keith L. Truog, Crown Point, Ind.

[73] Assignee: Avery Dennison Corporation, Pasadena, Calif.

[21] Appl. No.: 08/994,307

[22] Filed: Dec. 19, 1997

Related U.S. Application Data

[63] Continuation-in-part of application No. 08/806,122, Feb. 14, 1997, abandoned, which is a continuation of application No. 08/474,511, Jun. 7, 1995, Pat. No. 5,653,927.

[51] Int. Cl.$^7$ .................................. B32B 3/00; B05D 3/02
[52] U.S. Cl. .................... 264/510; 264/135; 427/380; 427/393.5; 427/412.1; 427/419.5; 427/428
[58] Field of Search ..................................... 264/134, 135, 264/510; 427/380, 393.5, 412.1, 419.5, 428

[56] References Cited

U.S. PATENT DOCUMENTS

| | | |
|---|---|---|
| 3,524,906 | 8/1970 | Schmitt et al. . |
| 4,154,876 | 5/1979 | Segawa et al. .......................... 427/195 |
| 4,220,679 | 9/1980 | Backhouse .............................. 427/401 |
| 4,359,504 | 11/1982 | Troy ........................................ 428/403 |
| 4,403,003 | 9/1983 | Backhouse ........................... 427/407.1 |

(List continued on next page.)

FOREIGN PATENT DOCUMENTS

| | | |
|---|---|---|
| 266109 | 5/1988 | European Pat. Off. . |
| 285071 | 10/1988 | European Pat. Off. . |
| 352298 | 11/1993 | European Pat. Off. . |
| 8807416 | 10/1988 | WIPO . |
| 9403337 | 2/1994 | WIPO . |
| 9400083 | 5/1994 | WIPO . |

OTHER PUBLICATIONS

Chattha & Cassatta "New Crosslinked Polymeric Particles for High Solids Basecoat–Clearcoat Paints," *ACS Polymeric Mathematics, Science & Engineering*, Apr.–May 1986, pp. 326–330.

G. Dale Cheever and Phuong–Anh P. Ngo, "Effect of Substrate and Paint Layers on the Roughness and Appearance of a Silver Base Coat/Clear Coat System," *Journal of Coatings Technology*, vol. 61, No. 770, Mar. 1989, pp. 65–71.

Toyo Aluminuim K.K., "The Orientation of Aluminuim Pigments in Automotive Finishes," *Polymers Paint Colour Journal*, Oct. 29, 1980, p. 796 and 798.

Journal of Coatings Technology, vol. 64, No. 811, Aug. 1992, pp. 71–77. Color Variation of Automotive Metallic Finishes, Tachi et al.

*Primary Examiner*—Erma Cameron
*Attorney, Agent, or Firm*—Christie Parker & Hale

[57] ABSTRACT

A thermoplastic and thermoformable pigment-containing metallic automotive paint is solvent cast and dried to form a finished metallic automotive paint coat for a decorative film used in a thermoforming process to form an exterior paint layer on a molded plastic automotive body panel. The paint coat contains a pigment uniformly dispersed in a polymeric binder material preferably comprising an alloy of a polyvinylidene fluoride (PVDF) copolymer and an acrylic resin in which the PVDF copolymer is provided as a dispersion in the acrylic resin. Preferably, the dispersed form of the PVDF copolymer has a particle size of about eleven microns or less, and more preferably a mean particle size range of about 3 to about 4.5 microns. The dispersion ratio is preferably from 80% to 20% PVDF copolymer and from 20% to 80% acrylic resin, respectively, by a weight. A low molecular weight form of the PVDF copolymer is preferred and characterized by a melt viscosity of 17,000 to 20,000 poise at 230° C. Reflective flakes are uniformly dispersed in the polymeric dispersion material and the dispersion form of the PVDF copolymer inhibits parallel orientation of the reflective flakes to produce a more random orientation that achieves a metallic appearance similar to standard spray painted metallic paint coats.

33 Claims, 6 Drawing Sheets

U.S. PATENT DOCUMENTS

| | | | |
|---|---|---|---|
| 4,451,597 | 5/1984 | Victorius | 524/39 |
| 4,605,596 | 8/1986 | Fry | 428/423.3 |
| 4,652,470 | 3/1987 | Das et al. | 427/407.1 |
| 4,692,481 | 9/1987 | Kelly | 523/219 |
| 4,725,640 | 2/1988 | Cowles | 524/439 |
| 4,810,540 | 3/1989 | Ellison et al. | 428/31 |
| 4,900,611 | 2/1990 | Carroll, Jr. | 428/216 |
| 4,902,557 | 2/1990 | Rohrbacher | 428/215 |
| 4,931,324 | 6/1990 | Ellison et al. | 428/31 |
| 4,943,680 | 7/1990 | Ellison et al. | 427/154 |
| 5,001,000 | 3/1991 | Rohrbacher | 428/215 |
| 5,030,394 | 7/1991 | Sietses et al. | 264/28 |
| 5,114,789 | 5/1992 | Reafler | 428/328 |
| 5,132,148 | 7/1992 | Reafler | 427/393.5 |
| 5,342,666 | 8/1994 | Ellison et al. | 428/46 |

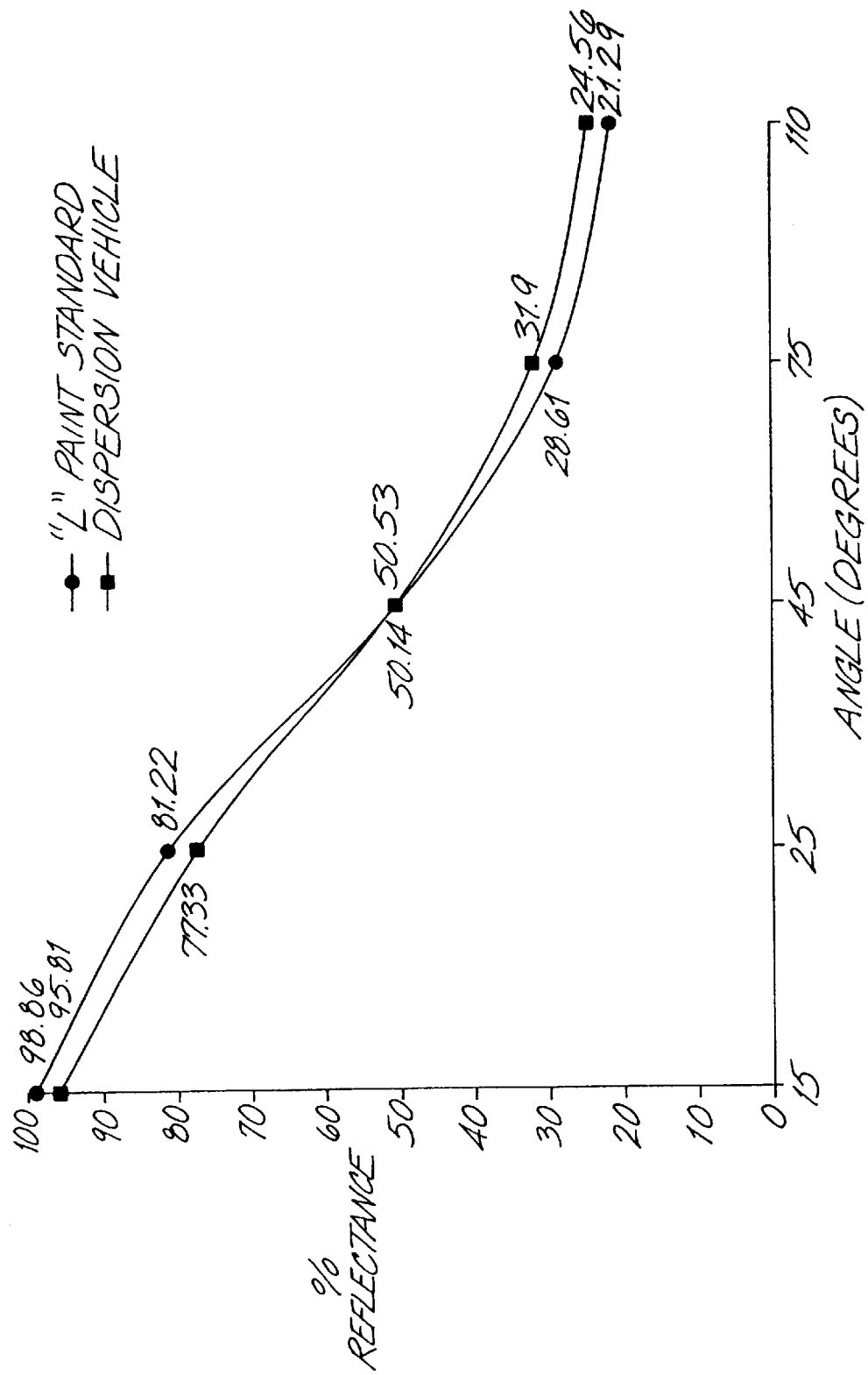

CONTROL OF METALLIC APPEARANCE IN AUTOMOTIVE CAST PAINT FILMS

CROSS REFERENCE

This is a continuation-in-part of application Ser. No. 08/806,122, now abandoned filed Feb. 14, 1997, which is a continuation of application Ser. No. 08/474,511, filed Jun. 7, 1995, now U.S. Pat. No. 5,653,927.

FIELD OF THE INVENTION

This invention relates generally to dry paint transfer techniques, and more particularly, to a process for making a dry paint transfer film in which a pigmented paint coat containing randomly oriented metallic flakes closely matches the appearance of traditional metallic spray painted finishes for automobiles.

BACKGROUND OF THE INVENTION

Automotive design and manufacture present a unique set of problems in the selection of materials and processes used in the manufacture of automobile bodies. Recent trends in the selection of construction materials for automobile bodies and their components include the use of plastic materials for many components while the main body panels continue to be made principally from sheet metal. The use of combinations of materials for the construction of the different components of an automobile present unique problems in the matching of the paint finishes of the different components. Matching metallic paint finishes has been especially problematic.

For example, for automobile body components made of sheet metal, painting processes have generally included either spray painting the body panel or sometimes dipping the body panel or even a partially assembled car body. In either case, the painted finish is then baked at high temperature to harden the painted surfaces thoroughly. Most such paint systems use acrylic or urethane enamels that chemically cross link during the baking step to form a hard, glossy, durable paint coat.

In developing such baked-on painting processes, it has been determined that various visual effects can be created by varying the orientation of the metallic flakes used in a metallic paint finish. Sometimes the metallic flakes are oriented so as to be essentially parallel to the outer surface of the paint layer. These metallic paint finishes have what is known as high "flop" and produce bright, often desirable visual effects. Other times, a more random orientation of the metallic flakes is sought in order to achieve a different, more appealing metallic appearance. Such a random orientation of the metallic flakes in a baked-on and cross-linked acrylic or urethane enamel paint finish has been achieved by traditional spray painting techniques. Sometimes the random flake orientation has been enhanced by the addition of microspheres to the paint, as disclosed by Backhouse in U.S. Pat. No. 4,403,003.

In recent years the trend toward use of more plastic automobile body components has led to the development of new painting techniques. An initial problem to be overcome was that the plastic auto body panels and parts cannot be subjected to high temperatures for solvent evaporation and curing as is done in traditional sheet metal painting processes.

In order to overcome this problem, processes for making thermoformable paint films were developed. According to these processes, a paint coat comprising a polymeric material is cast in thin film form onto a flexible heat-resistant temporary casting sheet. The paint coat is then dried by passing the sheet through an oven, followed by removing the paint coat from the casting sheet and transferring the paint coat to a thermoformable backing sheet. The paint coat on the thermoformable sheet retains the durability, gloss and many other appearance properties necessary for exterior automotive applications. The thermoformable paint sheets then can be thermoformed into the complex three-dimensional shapes of the plastic automobile parts or panels without detrimental effect on the appearance properties of the paint finish. The thermoformed sheet then can be molded to a plastic substrate body panel or part in an injection mold. This is known as an "insert mold" process. Alternatively, the thermoformable sheet can be shaped in the mold by the molding material itself in an "in mold" process.

Such processes have been successful in achieving paint coats with high gloss levels, high distinctness-of-image, excellent durability and other desirable properties. Generally, the paint coats comprise a clear coat and a separate pigmented color coat. The pigmented color coat can also include reflective flakes to give the paint a desirable metallic appearance. The clear coat and color coat may be formed as separate thin film coatings which are dried and bonded to one another. While the use of a clear coat is optional, it is generally desired because it contributes to higher gloss for the finished paint film as well as better durability and weatherability. The multilayer paint coat can be formed by the sequential application of first a clear coat and then a color coat to the temporary casting sheet. The paint coats are applied in this order because the smooth casting sheet surface imparts a high gloss to what will ultimately be the outermost surface of the paint film once removed from the casting sheet and applied to a substrate.

In one process disclosed in U.S. Pat. No. 4,931,324 to Ellison et al., a clear coat is applied by reverse roll coating and a pigmented color coat containing flakes is applied by conventional spray painting techniques. The disclosed spray paint techniques and the polymeric materials used in the color coat produce what is described as an essentially parallel orientation of the reflective flakes. U.S. Pat. No. 4,769,100 to Short discloses another process involving a decorative sheet applied to a contoured substrate by a shrink wrap process, in which metallic automotive paint films are applied to a stretchable carrier by spray painting techniques. The flakes are said to be essentially parallel and remain essentially parallel after vacuum forming to conform to the substrate surface.

Processes using paint transfer films for applying automotive paints to molded plastic panels and parts have been carried out successfully using thermoplastic paint films made from an alloy of fluoropolymer and acrylic resins. Such processes have included a first step in which a clear coat is made by preparing a solution of a fluorinated polymer such as polyvinylidene fluoride (PVDF), an acrylic resin such as polymethyl a methacrylate, and a solvent. Alternatively, the PVDF may be present as a dispersion in a solution of acrylic resin and the solvent. The polymeric material is applied to a casting sheet and dried by passing it through an oven. A color coat is then applied over the clear coat. The color coat contains basically the same polymeric materials as the clear coat except that it also includes the pigment, and reflective flakes also can be added to achieve a metallic paint finish. The color coat is then dried and optional size coats and/or backing sheets can be applied to the color coat by the methods described previously.

It is important to recognize that these thermoplastic paints films, or those that may be lightly cross-linked, though dried and hardened by a heating process, are very different from the hard, baked-on acrylic and urethane enamels applied to preformed components by standard sheet metal spray painting techniques. Since thermoplastic or predominantly thermoplastic paint films either do not cross link or at least retain most thermoplastic properties, they are not hard and brittle like the thermoset films, but rather are capable of elongating during thermoforming without cracking, hazing, or otherwise resulting in unacceptable paint finishes.

In making the thermoformable paint films that are preferred for dry paint transfer films used in coating plastic automobile components, the traditional casting of solvent-based liquid paint coats, such as by roll coating processes, tends to produce a parallel orientation of the reflective flakes. Such coating techniques do not achieve the more random orientation of reflective flakes that has become a preferred metallic appearance and which is characteristic of the spray painted hard, durable thermoset paint coats used in the prior art. Spray coating of thermoformable paint films on a carrier sheet is said to produce an essentially parallel orientation of the flakes, as disclosed in Ellison et al. U.S. Pat. No. 4,931,324 and Short U.S. Pat. No. 4,769,100, mentioned previously. U.S. Pat. No. 5,132,148 to Reafler also discloses a process for making a decorative transfer film for exterior automobile body panels. In this process a solvent-based polymeric color coat with dispersed reflective flakes is extruded onto a stretchable carrier sheet. This process is said to align the flakes in a generally parallel orientation and produces high "flop."

Spray painting is not a desirable approach in producing decorative transfer films because it requires low viscosity, low solids paint coats with a high percentage of solvent. Elaborate and expensive environmental controls are required in order to reduce the solvent emissions during the coating process. Roll coating processes have heretofore been unsuccessful in achieving a random orientation of the reflective flakes in a metallic paint film to produce desirable metallic appearance effects. Extrusion of paint coats containing pigments also is a difficult process in which to achieve uniform coloration in the finished film.

Sheet metal parts spray painted with highly metallic automotive paint films will look the same when the finished panel is turned in different orientations, say 90°, 180°, and 270°. On the other hand, the use of roll coating techniques to produce dry paint films for automotive use presents a color matching problem for certain highly metallic automotive colors. Metallic paint coats applied by roll coating techniques move through the coating process in a machine direction which can influence flake orientation. As a result, color differences (relative to a spray painted thermoset-type paint film standard) can result when the panel is turned 90° or 270° from the machine direction.

Color matching also can be a problem for certain light metallic colors. Metallic paint films are commonly assessed for their color matching characteristics at different angles known as the "flash," "face," and "flop" angles. The flash angle is typically 25° off specular; the face angle is 45° rotated off specular; and the flop angle is 75° rotated off specular. Some difficult to match light metallic colors are not dark enough (when compared with the spray painted standards) at the face and flop angles and they also lack brightness at the flash angle.

Thus, there is a need for a process for making a dry paint transfer film in which a pigmented metallic automotive paint coat achieves a sufficiently random orientation of the reflective flakes to closely match the metallic appearance of conventional spray painted metallic paint coats. Such color matching should occur over a wide range of angular orientations of the finished panel. A process using roll coating techniques is desirable to avoid the drawbacks of spray painting and extrusion of pigmented films containing flakes. There is a further need to produce uniform flake orientation visual effects in metallic colors applied by a roll coating process which are independent of machine direction from the roll coating process. There is also a need to produce light metallic paint films that are sufficiently dark in color to produce good color matching at the face and flop angles and good brightness at the flash angle of measurement.

SUMMARY OF THE INVENTION

Briefly stated, the invention overcomes the prior art's inability to effectively produce paint films that match the random orientation of reflective flakes of a traditional spray painted finish through roll coating techniques. According to one embodiment of the invention, a random orientation of reflective flakes in a pigmented automotive paint coat is achieved by adding the reflective flakes and pigment to a paint vehicle in which a fluorinated polymer is formed as a dispersion in a solution of a solvent or mixture of solvents and an acrylic resin. The paint coating thus formed can be roll coated onto a carrier sheet and then fused and dried by solvent evaporation to form a metallic paint film in which the dispersed form of the fluorinated polymer inhibits parallel orientation of the flakes. The paint film thus produced has an absence of optical haze and a random orientation of reflective flakes that closely matches the random orientation and metallic appearance of the reflective flakes in a spray-painted baked-on and cross-linked acrylic enamel or urethane paint finish, for example. The similarity in flake orientation can be quantified by comparing the "Travel Index" and/or the "Spectral Curve" of the paint film with the film to be matched, described as follows.

The properties of metallic paint coatings have been defined as varying with the orientation of the reflective flakes in the finished paint coat. Certain tests have been developed to measure the physical properties and characteristics of such metallic paint coatings and are extremely useful in determining whether two different paint coatings match one another. These tests generally measure the property referred to previously as "flop," which measures a metallic paint coat's ability to appear to change colors and/or lightness and darkness depending upon the angle from which a painted surface is viewed.

One such test determines what is referred to as the Travel Index of a paint coating. According to this test, a multi-angle spectrophotometer such as an X-Rite® Model MA68 multi-angle spectrophotometer is used to measure the amount of reflectance of a source lamp at various viewing angles. The source lamp is oriented such that a specular angle of 45° is achieved and the percent reflectance is automatically measured at different angles from the specular. Generally, measurements are taken at 15°, 25°, 45°, 75° and 110° from the specular angle. Such a test method generally indicates the degree to which lightness and darkness changes take place as a result of viewing a metallic paint finish at different angles. This measurement is useful for comparing two different paint coatings to determine whether their reflective flakes are similarly oriented and therefore have a similar metallic appearance.

A second test determines a "Spectral Curve" for a given paint color. According to this test, for a particular viewing angle, the percent reflectance is measured over the various wavelengths of the light reflected from the paint coating. This too is an effective way to compare two paint coatings for color match dependent upon the orientation of the reflective flakes.

Referring again to the process of this invention, the fluorinated polymer is preferably a polyvinylidene fluoride (PVDF) copolymer of low to medium molecular weight. However, homopolymers of PVDF also are useful in the metallic paint films of this invention. Preferred acrylic resins are polymethylmethacrylate (PMMA), polyethylmethacrylate (PEMA) or mixtures of the two. PVDF copolymers having an average particle size greater than about 35μ (microns) tend to cause optical haze when the paint coat is fused under application of heat. Copolymers of PVDF are generally preferred over homopolymers when they provide a dispersion with good flow characteristics without the need for aggressive solvents. Aggressive solvents are undesirable as they can tend to attack the clear coat, creating flaws in the finished paint film, most notably, reduced distinctness-of-image.

In another form of the invention it has been discovered that color matching is improved for certain metallic colors when a low level of a fine particulate inert filler material is added to the paint formulation. In this embodiment increased light scatter at the face and flop angles is produced. The presence of the filler does not adversely affect film clarity or color but produces better color matching at different viewing angles when compared with the same paint formulation in the absence of the inert filler. In one embodiment the preferred filler material is a fine particulate silica contained at a level of less than about two percent by weight, more preferably 1-½%, of the paint formulation.

The paint film made by this invention can be thermoformed to various shapes through well known thermoforming techniques. The finish of the thermoformed product has been shown to match closely with the finish of traditional hard, durable, baked-on spray painted metallic automotive paint films. Little, if any, of the random orientation of the reflective flakes is lost in the thermoforming step. Travel Index and Spectral Curve measurements and comparisons show very accurate matches in metallic appearance over a wide spectrum of viewing angles.

These and other aspects of the invention will be more fully understood by referring to the following detailed description and the accompanying drawings.

BRIEF DESCRIPTION OF THE DRAWINGS

FIGS. 7 and 8 are Travel Index curves showing a comparison of a solution-based paint film and a dispersion-based paint film of this invention when matched with a metallic paint standard.

DETAILED DESCRIPTION

Figure 1A:
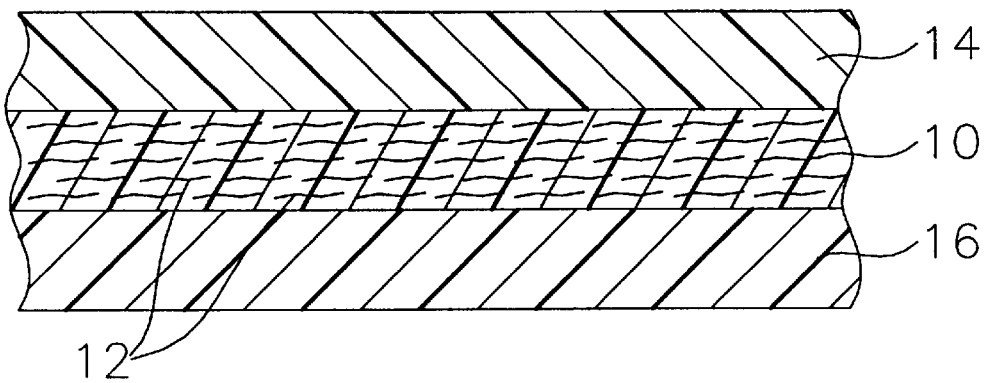
FIG. 1*a* is a schematic cross-sectional view illustrating a prior art roll coated pigmented metallic automotive paint film.

Referring to FIG. 1A, a prior art roll coated paint film comprises a color coat 10 which includes reflective flakes 12 and a uniformly dispersed pigment. An exterior clear coat 14 coated over the color coat provides enhanced durability, weatherability and gloss to the paint finish. The entire paint coat is bonded to a molded plastic substrate panel 16 which represents the automobile part to which the paint finish has been bonded. A thermoformable backing sheet (not shown) is often used between the color coat and the substrate. As illustrated in this drawing figure, the reflective flakes 12 are oriented such that they are generally parallel to the outer surface of the paint finish.

Figure 1B:
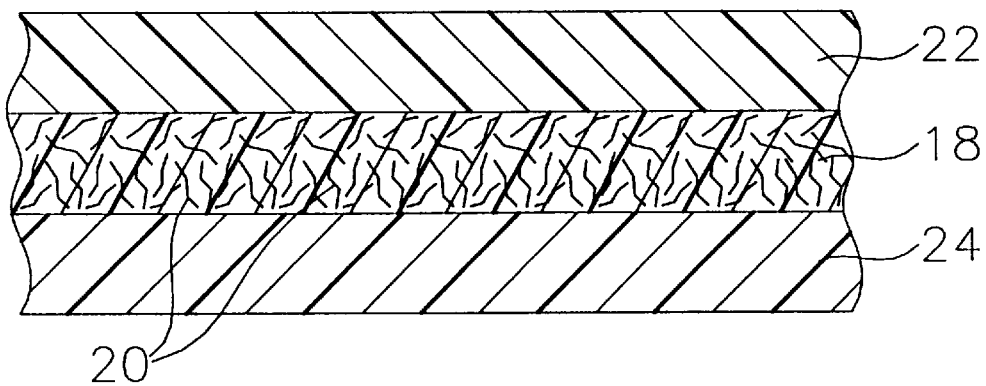
FIG. 1*b* is a schematic cross-sectional view illustrating a prior art hard, durable baked-on metallic automotive paint coat applied to sheet metal by spray painting techniques.

In contrast, and according to FIG. 1B, a prior art baked-on paint coat of the hard, durable thermoset type includes a color coat 18 containing a uniformly dispersed pigment and reflective flakes 20. An exterior clear coat 22 provides the desired gloss and durability to the paint finish. This film is commonly applied directly to a sheet metal body part 24 by spray painting techniques which cause the metallic flakes to be randomly oriented rather than being oriented parallel to the paint finish.

Because of the wide difference in orientation of the metallic flakes of the two paint coatings illustrated in FIGS. 1A and 1B, the two paint coatings do not have the same overall appearance even though the amounts of pigment and reflective flakes used are identical. Generally, the roll coated thermoformable paint film of FIG. 1A with its parallel flake orientation has a bright appearance when viewed at the near specular and specular angles but lacks the luster and sparkle of the hard, durable baked-on paint coat of FIG. 1B, in which the flakes are more randomly oriented. It should be recognized that the term "baked on" as used in this application refers to paint coatings that are applied directly to an already formed article and then baked to form a hard cross-linked finished paint coat. In contrast, thermoformable and thermoplastic paint films refer to paint coatings that are cast on a carrier sheet and subjected to elongation when later thermoformed to a desired three-dimensional shape. Lightly cross-linked paint films having thermoplastic elongating properties that maintain desired optical and mechanical properties also are within the scope of the thermoformable and thermoplastic paint films of this invention.

Figure 2:
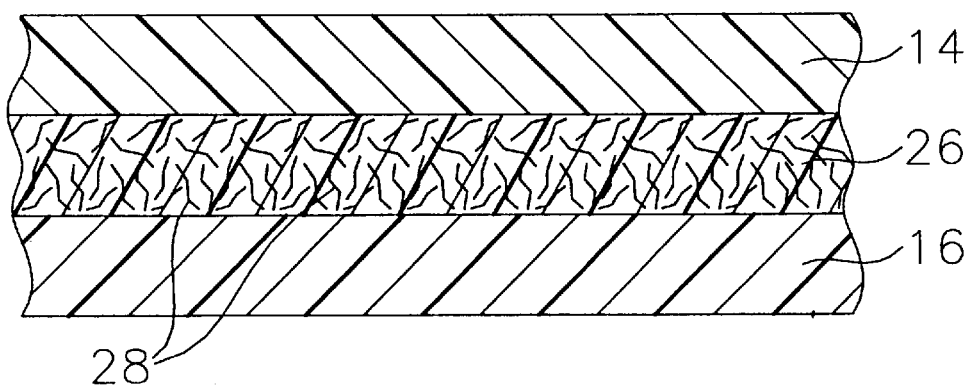
FIG. 2 is a schematic cross-sectional view illustrating a prior art roll coated pigmented metallic automotive paint film of the present invention.

According to the present invention, paint coats containing randomly oriented metallic flakes similar to standard spray painted baked-on automotive paints can be achieved through roll coating techniques. As a result, the desired metallic appearance of such spray painted automotive paint coats, which heretofore have been applied to sheet metal parts, can be produced in decorative dry paint transfer surfacing films applied to plastic body parts without the disadvantages of spray painting. As illustrated in FIG. 2, a color coat 26 of a metallic automotive paint can be formed by such roll coating techniques with randomly oriented reflective flakes 28 uniformly dispersed in the paint coat. An outer clear coat 30 and an underlying plastic substrate panel 32 also are shown in FIG. 2. The clear coat 30 can be coated on a carrier sheet by roll coating techniques, or the clear coat can be formed by extrusion techniques.

The random orientation of the reflective flakes is achieved, in one embodiment, by forming the paint coat from a combination of an acrylic resin and a thermoplastic fluorinated polymer wherein the fluorinated polymer is present as a dispersion in, rather than in solution with, the acrylic resin. The alloy of the fluorinated polymeric material and the acrylic resin has thermoplastic properties and is thermoformable into a desired three dimensional shape.

As an alternative, polyvinyl chloride dispersion resin may be used in place of the fluoropolymer. As a further alternative, a polyurethane resinous material lightly cross-linked into the PVDF/acrylic resinous material can be used to achieve certain mechanical properties such as increased durability and mar resistance.

The paint coat formulation is prepared by mixing the acrylic resin with a suitable organic solvent and by applying heat to dissolve the acrylic resin in the solvent. The mixture is then allowed to cool sufficiently before adding the fluorinated polymer component so that the fluorinated polymer does not dissolve, but is maintained as a dispersion in the acrylic solvent-based mixture. The pigment then can be added to the mixture in appropriate quantities to achieve the desired uniformly dispersed color. The flakes are also uniformly dispersed in the color coat formulation. By maintaining the fluorinated polymer component as a dispersion in the acrylic resin solution, the reflective flakes of the resulting film become randomly oriented by the dispersed form of the particles of the fluoropolymer component which separates the flakes and thereby inhibits a parallel orientation such as that characteristic of the flakes in a prior art solution-based formulation.

Figure 3:
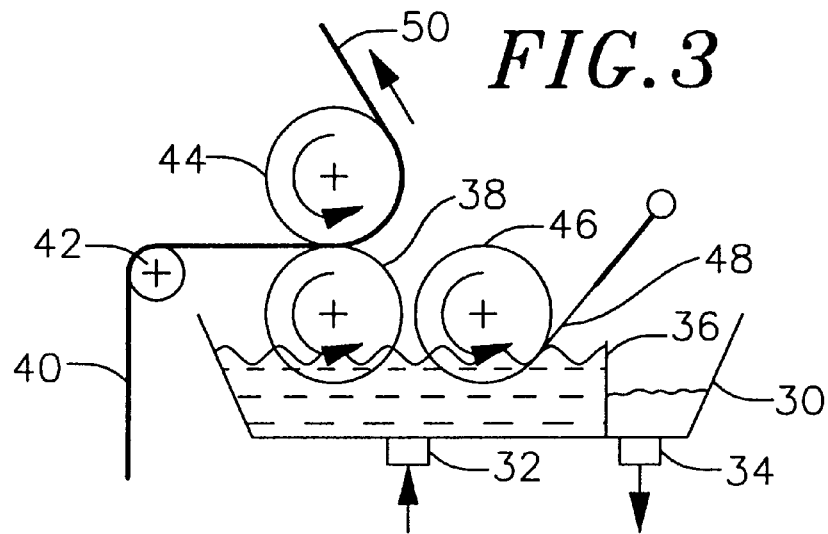
FIG. 3 is a schematic diagram illustrating a preferred roll coating technique for applying the color coat and clear coat to a carrier sheet, according to the present invention.

The resulting dispersion can be coated onto a carrier sheet by traditional casting techniques such as by roll coating techniques. Generally, reverse roll coating, knife over roll, or slot die coating techniques are preferred. The clear coat and color coat are coated onto the carrier sheet by a reverse roll coating process illustrated in FIG. 3, although the clear coat and color coat can be applied by gravure printing, or other conventional coating techniques involving liquid or solvent coating in which the paint coat is spread in liquid form onto the carrier and the resulting paint coat can be characterized as molecularly unoriented. Referring to the reverse roller coating process of FIG. 3, the color coat material is contained in a coating pan 30 having a lacquer inlet 32 in the main portion of the pan and a lacquer drain 34 on an opposite side of a weir 36. An applicator roll 38 rotates to pick up the lacquer from the pan and coat it onto a carrier film 40 which passes over a guide roll 42 and then passes between the applicator roll and a rubber backup roll 44. As mentioned previously, the clear coat is coated first and then dried, followed by casting the color coat on the clear-coated carrier sheet. FIG. 3 represents coating of either a clear coat or a color coat containing flakes on the polyester carrier sheet 40. A metering roll 46 adjacent the applicator roll rotates in the same direction as the applicator roll. A doctor blade 48 wipes the surface of the metering roll to properly control the thickness of the coating on the applicator roll. The adjustable gap between the metering roll and the applicator roll controls the thickness of the coating on the surface of the applicator roll. The coating picked up by the applicator roll is then coated onto the polyester carrier film as the film passes into contact with the reverse-rotating applicator roll. The applied coating on the film is shown at 50. The coated film then passes to a drying oven. The resulting paint film can be used to coat automobile components by traditional thermoforming techniques. It is important to note that even after thermoforming the films retain the randomly oriented reflective flakes of the paint film.

The fluorinated polymer component is preferably a thermoplastic fluoropolymer such as polyvinylidene fluoride (PVDF). Copolymers are generally preferred over homopolymers because they can result in less haze of the resulting paint film. Copolymers of vinylidene fluoride and tetrafluoroethylene, and copolymers of vinylidene fluoride and hexafluoropropylene have been shown to work well. The preferred PVDF copolymers are of medium to low molecular weight as characterized by a melt viscosity of below about 20,000 poise.

The particle size of the dispersed fluorinated polymer also is an important factor in producing the random flake orientation. However, acrylic resin levels in the formulation also can be used to control film clarity. Haze problems can be avoided with either PVDF homopolymers or copolymers with the proper levels of acrylic resin in the formulation. A maximum PVDF particle size of greater than $35\mu$ tends to cause a loss of clarity and haze in the resulting paint film when the film fuses during the drying step. It has also been found that if the average particle size is too small, the randomness of the orientation of the reflective particles is largely lost. In one embodiment, the particle size distribution is as follows. Substantially none of the particles have a particle size greater than $35\mu$, and more preferably, about $25\mu$. The particle size distribution curve generally follows a standard bell shaped curve, with essentially all particles falling within the range of about $1-21\mu$. The mean particle size is about $6-7\mu$. Approximately 90% of all particles are less than $11\mu$ in size. Although the particle size distribution curve can vary somewhat, it is preferred that the average particle size fall within the range of about $3-11\mu$. The fluorinated polymer material can be air-milled to reduce the particle size to the desired range. It should also be recognized that by varying the particle size, various different visual appearances can be achieved for the finished paint film. For example, the degree to which the reflective flakes are randomly oriented can be varied between a highly oriented, that is, a generally parallel orientation, to a highly random orientation by controlling the particle size of the dispersed fluoropolymer.

In one embodiment of the invention, color matching, particularly for light metallic paint films, is improved at the face, flop and flash angles with the fluorinated polymer material having a reduced mean particle size distribution. In this embodiment the mean particle size is below $6.5\mu$ and more preferably within the approximately 3 to $4.5\mu$ range. Films having this finer particle size distribution have improved clarity. In one process for producing the finer particle size dispersion material the fluorinated polymer is subjected to fluidized bed/classifier techniques.

The mean particles sizes described previously are on a by volume (mv reading) basis.

The preferred acrylic resins used in the invention are acrylics such as polymethylmethacrylate (PMMA) and polyethylmethacrylate (PEMA) resins or mixtures thereof, including methacrylate copolymer resins and minor amounts of other comonomers. The acrylic resin is useful in adding clarity to the system as well as for dispersing the pigment and the flakes.

The solvents used in forming the dispersion are preferably non-aggressive solvents such as heptyl acetate. However, if necessary to achieve good fusion of the fluoropolymer and acrylic resins, a more aggressive solvent such as butylacetone (BLO) can be used. Generally, a blend of heptyl acetate and BLO is preferred. However, if a homopolymer is used as the fluorinated polymer, a higher concentration of the more aggressive solvent is required. The reason that the amount of aggressive solvent is to be minimized is to prevent the solvent in the dispersion from attacking the clear coat of the paint film. Even though the clear coat eventually forms the outermost layer on the painted substrate, it is generally cast on the casting film before the color coat. If too much of an aggressive solvent is used, the color coat can penetrate too deeply into the clear coat causing undesirable visual effects.

The preferred ratios of the fluorinated polymer to acrylic resin in the dispersions of the present invention are generally between about 0.25 to 4.0 parts PVDF to one part acrylic resin for a PVDF and PEMA dispersion, by weight of the total solids contained in the PVDF/acrylic blend. Most preferably, the PVDF to acrylic ratio is about 25–70% PVDF to about 30–75% acrylic resin, by weight. Higher amounts of PVDF generally result in reduced clarity for the resulting paint films.

A requirement for the reflective flakes and pigment used in the dispersion is that they be compatible with the particular fluorinated polymer and acrylic resin used in the dispersion. A metallic paste comprising aluminum flakes in a hydrocarbon solvent is generally used as the source of reflective flakes. However, mica flakes can also be used. Exterior automotive pigments are generally provided in a carrier of acrylic resin and solvent. It is important that the acrylic resin in the carrier for the pigment be compatible with the resin blend of the paint coat dispersion. Generally about 88–90 parts by weight of dispersion vehicle (polymer blend and solvents) are combined with about 10–12 parts by weight of metallic paste and pigment, including carrier, to produce the dispersion.

Generally, the clear coat has a dry film thickness of about 1.0 to 2.0 mils and the color coat has a dry film thickness of about 0.7–1.4 mils.

Other additives such as flow improvers and ultraviolet absorbers can also be added to the dispersion to obtain a finished paint film with the desired properties.

Following the steps of casting the clear coat and the metallic color coat on the carrier sheet, the composite paint coat is removed from the carrier and transfer-laminated to a thin, semi-rigid thermoformable polymeric backing sheet. A preferred backing sheet is made of ABS (acrylonitrile-butydiene-styrene) or a polyolefin such as polypropylene or polyethylene. The preferred backing sheet is about 20 mils in thickness, although the backing sheet can be from 10 to 40 mils thick. The backing sheet is then thermoformed into the desired three-dimensional shape, followed by molding the substrate panel to the thermoformed sheet in an injection mold. This process, known as the "insert-mold" process, together with the transfer-lamination and thermoforming steps are described in more detail in the applicant's International Application PCT/US88/00991, which is incorporated herein by this reference.

Alternatively, the transfer-laminated, thermoformable sheet can be placed directly in the injection mold without thermoforming it outside the mold. The sheet in this instance has a thickness of about 6 mils. The sheet is then formed into a contoured shape under heat and pressure in the injection mold by the molding material in what is referred to as an "in-mold" process. The polymeric materials used as substrate materials in either process are compatible with the polymeric material of the backing sheet and comprise ABS, polyolefin, polycarbonate and similar molded polymeric materials for automotive use.

The decorative transfer film made by this invention can produce a high gloss, high distinctness-of-image paint finish that also meets other exterior automotive specifications for durability and weatherability. The transfer sheet has a distinctness-of-image of greater than 60 before thermoforming, and this level is retained through thermoforming and following the molding step. As mentioned, the metallic color match produced by the random orientation of the flakes also is essentially retained after the thermoforming and molding steps.

The invention will more fully be explained by the following examples.

EXAMPLE 1

A metallic paint coating according to the present invention was prepared with the goal of matching the standard painted finish for 1994 General Motors Truck Color Gray Metallic (WAEM-8798). A vehicle for the pigment was first prepared by combining 26.42 parts by weight of the solvent Exxate® 700, produced by Exxon Chemicals that comprises heptoacetate in a blend of esters, and 11.32 parts by weight of butylacetone (BLO). To this mixture were added 0.11 parts by weight of the additive Solsperse 17000 to improve the flow properties of the mixture and 0.71 parts by weight of an ultraviolet (UV) absorber, Tinuvin 234. Then, while mixing the above mixture, 18.87 parts by weight of the acrylic resin polyethylmethacrylate (PEMA) were added. The PEMA used in this example was Elvacite® 2043, a product of DuPont. The resulting mixture was mixed and heated until the PEMA was completely dissolved. If necessary, the mixture was allowed to cool to less than 85° F.

While the PEMA solution was continuously mixed, and only after the solution had cooled to less than 85° F, 28.31 parts by weight of PVDF were added. In this example, Kynar® 2821, produced by Elf Atochem, was used as the PVDF. The PVDF was air-milled to produce a particle size distribution similar to that described previously. The mixture was mixed at high speed while scraping the sides of the container to achieve a dispersion of PVDF in the PEMA solution. During mixing, the temperature was not allowed to exceed 100° F.

While the PVDF was being dispersed in the PEMA solution, a solvent mixture of 7 parts by weight of Exxate® 700 to 3 parts by weight of BLO was premixed. A portion of this premix of solvent was added to dilute the dispersion after the particle size of the dispersed PVDF was reduced. The dispersion was diluted with the premixed solvent until the viscosity had been reduced to 2000±200 centipoise. A total of 14.25 parts by weight of the premixed solvent was necessary. The resulting dispersion was then used as a dispersion vehicle for the paint coating of the present invention.

A standard solution vehicle was then prepared by conventional methods. A solvent mixture of 35.14 parts by weight of methyl propyl ketone and 34.83 parts by weight of cyclohexanone was prepared and 22.52 parts by weight of PVDF (Kynar® 7201) were added under slow agitation along with 7.51 parts by weight of PMMA (Elvacite® 2008) under slow agitation. The mixing speed was increased as the mixture thickened and the mixing was continued until the resin was completely dissolved, taking care not to introduce any air bubbles into the solution.

The pigment dispersion was prepared by adding the following mixture to 90.92 parts of the dispersion vehicle under agitation: 0.68 parts phthalo blue dispersion, Gibraltar Chemical Works (460-34550), 0.2 parts carbazole violet dispersion (Gibraltar 460-37450), 6.00 parts jet carbon black dispersion (Gibraltar 460-39350), and 1.00 parts aluminum paste Silberline Mfg., Tamaqua, Fla. (5271AR). The dispersion was mixed for 20 minutes to thoroughly blend the ingredients.

For the solution vehicle 82.92 parts of vehicle were mixed with four parts methyl propyl Ketone, four parts cyclohexanone and the same percentages of color dispersions and aluminum. Extra solvent was added to get to 1000 cps, application viscosity.

The dispersion paint coating and the solution paint coating were each applied to a carrier sheet by a reverse roll technique, dried and removed from the carrier sheet. The dispersion coated paint film and the solution coated paint films were then compared to a hard, durable baked-on cross-linked urethane enamel paint film of the same metallic color applied by spray-painting techniques. While both the dispersion coated paint film and the solution coated paint film had close color matches to the paint sample, the dispersion coated paint film had a much better match in overall metallic appearance, especially when flop was considered.

Figure 4:
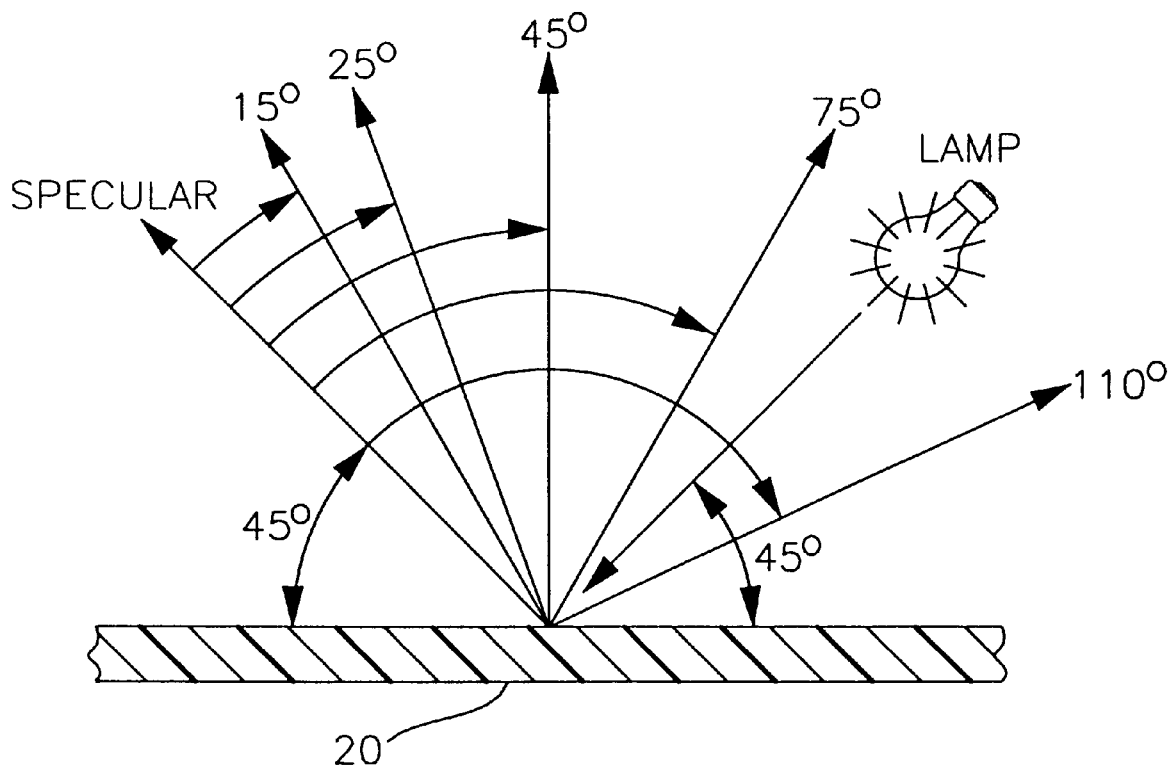
FIG. 4 is a schematic diagram illustrating the measurement angles used in measuring the Travel Index for a paint coat.

In order to quantify the above results, the three paint samples were compared using a multi-angle spectrophotometer. The use of such a spectrophotometer is illustrated schematically in FIG. 4. A lamp is directed to shine on a paint sample 20, and measurements of the reflectance at angles of 15°, 25°, 45°, 75° and 110° from the 45° specular angle were taken. The resulting curves define a "Travel Index" of each paint film, described previously.

Figure 5:
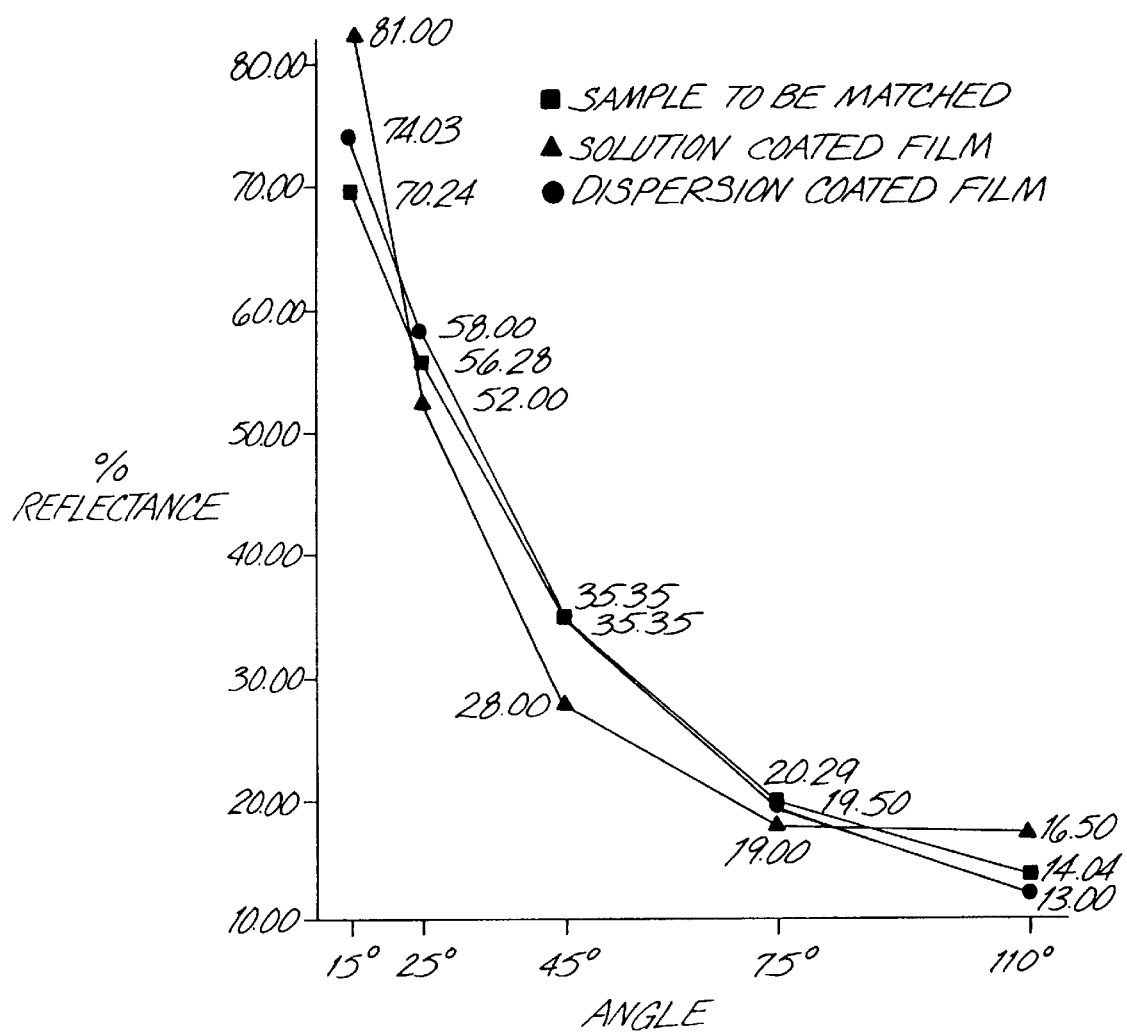
FIG. 5 is a diagram illustrating the Travel Index for the metallic paint film produced by the invention described in Example 1 and comparing its Travel Index to those for a conventional roll coated metallic paint film and for a spray painted metallic paint finish to which a match of metallic appearance is desired.

According to the test results illustrated in FIG. 5, the dispersion coated film as produced by the present invention has a near-perfect match to the standard spray painted baked-on urethane enamel test sample. In contrast, the solution coated paint film made by prior art roll coating methods did not match very closely. It reflected too much of the source light at the high and low angles, but too little of the source light at the intermediate angles.

EXAMPLE 2

According to this example, a dispersion paint coating of the present invention was prepared in order to match a sample of 1995 Ford Portofino (KXQCWHA, M-6623) metallic paint. A dispersion paint coating was prepared by mixing 90.42 parts by weight of the dispersion vehicle prepared in Example 1 with 5.23 parts by weight of a 352 mesh grade aluminum paste and 2.20 parts by weight of a 400 mesh grade aluminum paste. The 352 mesh grade aluminum paste was a paste made by Silberline Manufacturing Co., Inc. of Tamaqua, Pa. known as Sparkle Silver® 3141-ST and having an average particle size of 32.8μ. The 400 mesh grade aluminum paste was a product also made by Silberline and sold as Sparkle Silver® 5271-AR, having an average particle size of 17.8μ. To this mixture were added 0.23 parts by weight of Carbazole Violet pigment, 0.23 parts by weight of jet black pigment and 1.70 parts by weight of Indanthrone Blue pigment, all of which are sold by Gibraltar Chemical Works, Inc. of South Holland, Ill.

A solution paint coating was made by replacing the dispersion vehicle with the standard solution vehicle then using the same pigments to achieve the closest match possible.

Figure 6:
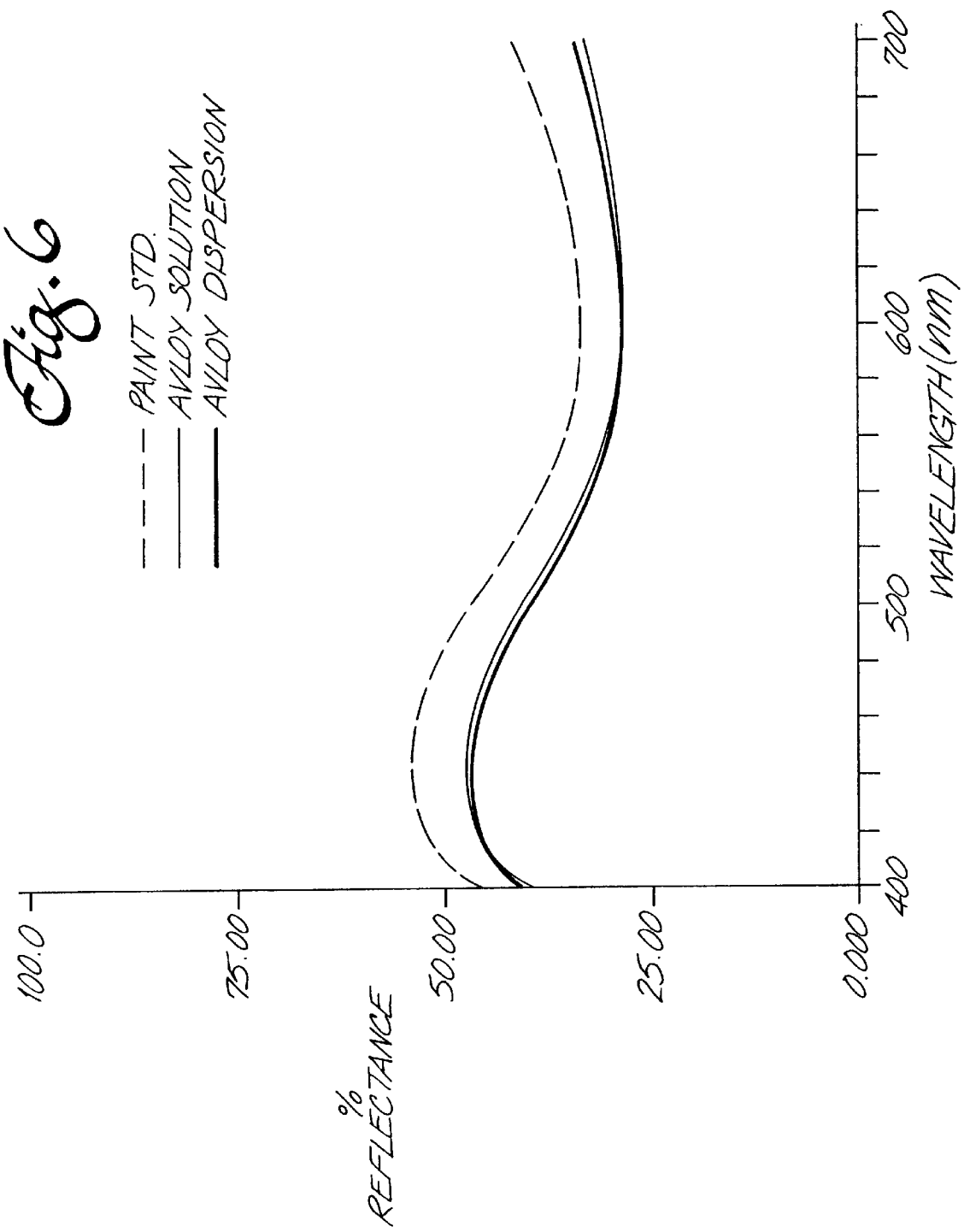
FIG. 6 is a diagram illustrating the Spectral Curve for the paint film produced by the invention described in Example 2 and comparing its Spectral Curve to those for a conventional roll coated metallic paint film and for a spray painted metallic paint finish to which a match of metallic finish is desired.

The two paint coatings were formed into paint films by reverse roll coating them onto carrier sheets and drying the coatings. The resulting films were then compared to a spray-painted baked-on urethane enamel paint sample of the same metallic color. While all three had closely matching color characteristics, the dispersion coated film had a better overall match to the flop characteristics of the standard spray-painted urethane enamel sample. This was quantified by plotting Spectral Curves for each of the three samples. According to this test method, the percent reflectance is measured at wavelengths between 400 and 700 nanometers (nm), and plotted, as shown in FIG. 6. All measurements were taken at a spectral angle of approximately 60°. As illustrated by FIG. 6, the dispersion coated paint film matches the standard paint sample almost identically. In contrast, the solution coated paint film has consistently higher reflectance over all measured wavelengths, indicating a much higher parallel orientation of the metallic flakes compared to the standard paint sample.

Figure 7:
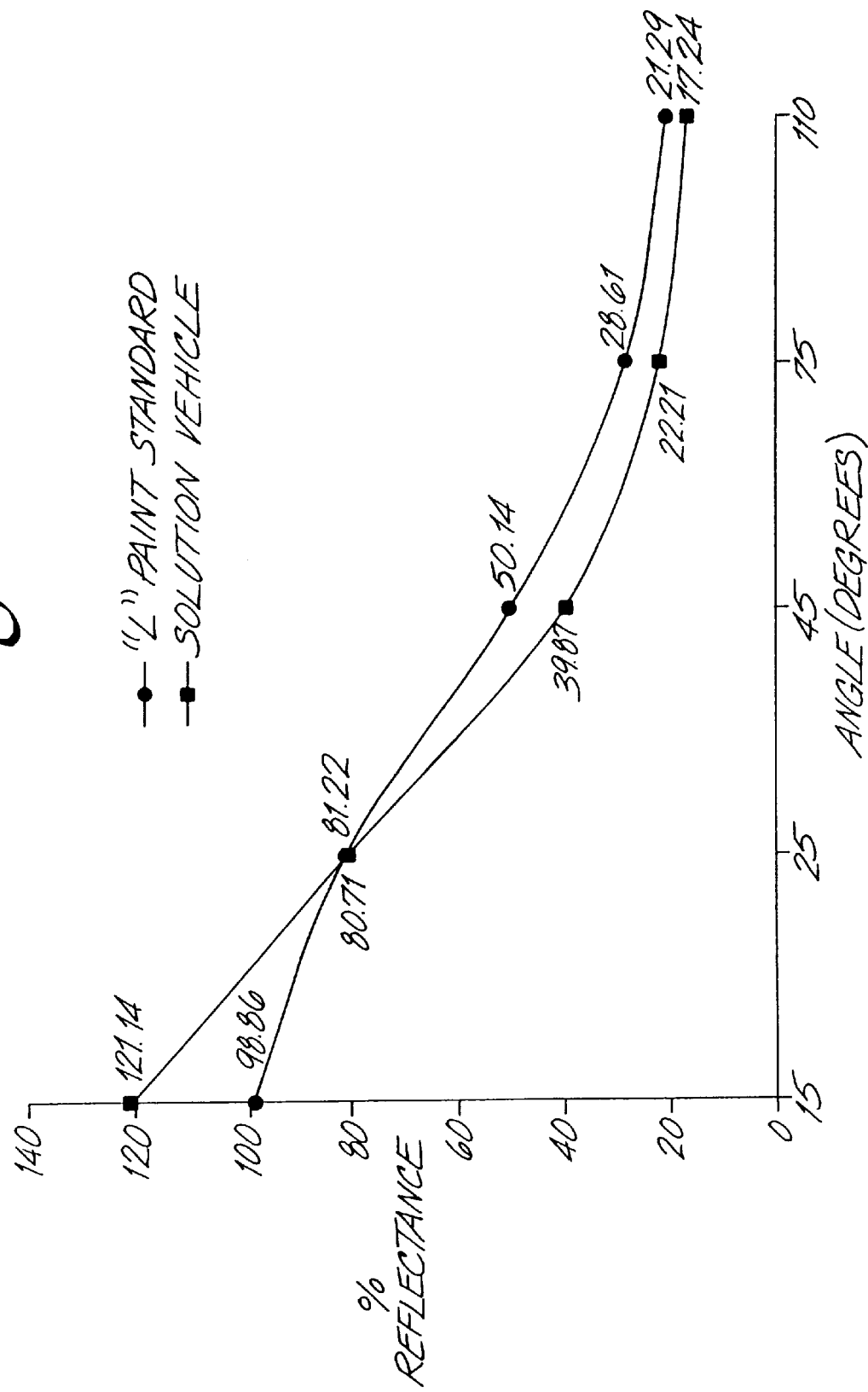

FIGS. 7 and 8 illustrate a comparison of the solution-based and dispersion-based paint films in matching a metallic paint standard.

EXAMPLE 3

For comparison purposes (described in examples to follow), a color coat vehicle for metallic/mica colors was prepared as follows:

| Ingredient | Parts |
|---|---|
| Exxate 700 | 36.42 |
| BLO | 15.57 |
| Solsperse 17000 | 0.11 |
| Tinuvin 900 | 0.71 |
| Elvacite 2043 | 18.87 |
| Kynar 2821 | 28.21 |

Parts are stated on a weight basis. Using the same procedures described in Example 1, the acrylic resin was completely dissolved and allowed to cool to below 85° F. The PVDF was ground to a particle size of below 20–25 microns using the air mill process described previously. Mean particle size was approximately 6.5 to 7.5 microns. The PVDF was added to the acrylic solution by procedures similar to those described in Example 1.

The following gold metallic color coat material was prepared using the color coat dispersion vehicle. Liquid viscosity was adjusted to 1200±200 centipoise with the premixed solvent ratio described in Example 1. The following pigment dispersions were added to the vehicle under agitation for 20 minutes, filtering through a vibrating 200 mesh screen.

| Ingredient | Parts |
|---|---|
| Color coat dispersion vehicle | 90.0 |
| Red oxide dispersion | 1.76 |
| Jet black dispersion | 1.16 |
| Magenta dispersion | 0.34 |

-continued

| Ingredient | Parts |
|---|---|
| Aluminum paste (SSP - 354) | 1.13 |
| Aluminum paste (3141-ST) | 2.05 |
| Gold mica | 1.56 |
| Exxate 700 | 1.0 |
| BLO | 1.0 |

Parts are stated on a weight basis. The red oxide, jet black and magenta dispersions are available from Gibraltar under dispersion nos. 460-36740, 474-39350 and 474-37500, respectively, for the 460-dispersions; the solvent typically comprises a blend of Exxate 600 and BLO for the 474-dispersions. The Gibraltar dispersions typically contain 20% pigment, 20% acrylic resin and 60% solvent, commonly MEK and toluene. The aluminum paste is available from Silberline and typically comprises 65% aluminum flakes in 35% solvent. The mica is available from EM Industries as 100% inert mica particles, under product designation Afflair 9303 satin royal gold.

EXAMPLE 4

A color coat material for certain hard to match highly metallic paints was prepared as follows. The color in this instance was a metallic beige. The color coat dispersion vehicle of Example 3 was used as a starting material. The color coat material was made following procedures similar to Examples 1 and 3.

| Ingredients | Parts |
|---|---|
| Color coat dispersion vehicle (Ex. 3) | 91.80 |
| Aluminum paste (5242) | 1.07 |
| Aluminum paste (5271) | 1.22 |
| Exterior white dispersion | 0.32 |
| Red oxide dispersion | 0.91 |
| Jet black dispersion | 0.44 |
| Perylene maroon dispersion | 0.27 |
| Syloid 244 | 1.83 |
| Exxate 700 | 1.07 |
| BLO | 1.07 |

The aluminum paste components are available from Silberline. The white, red oxide, jet black and maroon color dispersions are available from Gibraltar as 460-39700, 460-36740, 474-39350, respectively. The Syloid 244 is a fine silica with a mean particle size of about three microns available from Davidson Chemical Division of W. R. Grace.

For certain metallic colors addition of the silica particles produces paint films which better duplicate the "Travel" of the metallic paint standard. The silica particles produce increased light scatter at the face and flop angles.

EXAMPLE 5

A color coat vehicle was found to produce better color matching when darker color at the face and flop angles is needed.

| Ingredients | Parts |
|---|---|
| Exxate 700 | 37.52 |
| BLO | 16.04 |
| Solsperse 17000 | 0.11 |
| Tinuvin 900 | 0.69 |
| Elvacite 2043 | 18.26 |
| Kynar 2821 | 27.39 |

Parts are on a weight basis. The dispersion vehicle was prepared by procedures similar to those described in Examples 1 and 3, except that the PVDF was ground to less than 16 microns particle size. Mean particle size was 4.5 to 5.5 microns.

The following color coat was then prepared from the above dispersion vehicle:

| Ingredients | Parts |
|---|---|
| Dispersion vehicle | 89.68 |
| Blue/red dispersion | 0.86 |
| Blue green mica | 1.0 |
| Jet black dispersion | 0.84 |
| Green dispersion | 2.54 |
| Bronze mica | 1.01 |
| Moss green mica | 1.01 |
| Green/yellow dispersion | 0.82 |
| Exxate 700 | 1.12 |
| BLO | 1.12 |

Parts on a weight basis. The color coat formulation was prepared by procedures similar to those described in Examples 1 and 3.

The blue/red, jet black, green, and green/yellow color dispersions are available from Gibraltar as nos. 474-34100, 460-39350, 460-34900 and 460-35150, respectively. The moss green mica is available from EM Industries as Afflair 9444. The bronze mica is from EM Industries as Afflair 9500. The blue green mica is from Engelhard as no. 72892.

This paint film produced better color matching (when compared with the formulation of Example 3) for certain brighter metallic colors. Darker colors were produced at the face and flow angles and brightness was improved at the flash angle.

EXAMPLE 6

An alternative milling process was used to prepare the PVDF component of the color coat dispersion vehicle. In this process, Kynar 2821 raw material was milled in a fluidized bed classifier mill. The fluidized bed utilizes air streams at different angles to break up the particles which are then passed to a classifier which rejects the bigger particles and produces a fine particle size distribution. The classifier was operated at 594 rpm, at a supply pressure of 88 psig and at a feed rate of 88 lbs/hr. A PVDF mean particle size distribution of about 3 to 4.5 microns was produced. Essentially all particles were less than 21 microns. The resulting PVDF particles were substituted into the color coat vehicle formulation of Example 3, and clear films were produced and compared for clarity with the vehicle formulations of Examples 3, 4 and 5. Comparative tests revealed that the paint film produced by the formulation of this example had greater film clarity owing to the finer particle size. When used in light metallic color formulations such as a silver metallic paint coat, the resulting paint film had significant darker color at the face and flop angles.

We claim:

1. A process for controlling the metallic appearance of a metallic automotive paint film containing reflective flakes to achieve a random orientation of the reflective flakes, the process comprising:

casting a layer of a thermoplastic and thermoformable pigment-containing metallic automotive paint coat onto a carrier;

the cast paint coat comprising a dispersion of a fluorinated polymeric material in a solvent-based solution of an optically clear weatherable resinous material, the dispersed fluorinated polymeric material having a mean particle size of about eleven microns or lower and being uniformly dispersed in the solution of resinous material, the cast paint coat further comprising a pigment uniformly dispersed in the paint coat to provide coloration, and reflective flakes uniformly dispersed in the paint coat to impart to the paint film a metallic appearance; and drying the cast paint coat to fuse the paint coat and thereby form a finished metallic automotive paint film in which the parallel orientation of the reflective flakes to one another is inhibited such that the flake orientation of the finished paint film provides a randomly oriented distribution of the reflective flakes.

2. The process according to claim 1 in which the fluorinated polymeric material comprises a polyvinylidene fluoride (PVDF) copolymer and the resinous material comprises an acrylic resin blended with the PVDF.

3. The process according to claim 2 in which the paint coat is cast by coating the paint coat onto the carrier other than by spray painting techniques.

4. The process according to claim 3 in which the mean particle size is about 4.5 microns or less.

5. The process according to claim 1 in which the paint coat comprises polyvinylidene fluoride (PVVF) blended with an acrylic resin in which the PVDF comprises about 25% to 70% and the acrylic resin comprises about 30% to 75% by weight of the total solids in the paint film.

6. The process according to claim 5 in which the mean particle size is about 4.5 microns or less.

7. The process according to claim 6 in which the PVDF is milled to said particle size in a fluidized bed/classifier apparatus.

8. A coating process for controlling the metallic appearance of a cast automotive paint film so as to resemble the appearance of a spray painted metallic paint finish, the process comprising:

casting a layer of a thermoplastic automotive paint coat onto a supporting surface, the paint coat comprising a polyvinylidene fluoride (PVDF) copolymer dispersed in a solvent-based solution of an acrylic resin to form a dispersion in which the PVDF copolymer has a mean particle size of about eleven microns or less, the dispersion containing from about 20% to 80% PVDF and from about 80% to about 20% acrylic resin, respectively, by weight of the total PVDF/acrylic solids contained in the dispersion; the paint coat further comprising a pigment uniformly dispersed in the PVDF/acrylic resin dispersion to provide coloration, and reflective flakes uniformly dispersed in said dispersion to impart to the finished paint film a metallic appearance; and drying the paint coat on the supporting surface to fuse the paint coat and thereby form a finished metallic automotive paint film;

the paint coat being cast by a coating process in which the dispersed form of the PVDF particles in the acrylic solution disorients the reflective flakes to inhibit their parallel orientation such that the flake orientation in the finished paint film resembles the random distribution of a spray-painted metallic automotive paint coat of the same color, the finished paint film having a Travel Index substantially the same as the Travel Index for a fused spray-painted coat of the same color of metallic automotive paint when viewed at different viewing angles.

9. The process according to claim 8 including thermoforming the paint coat to a three dimensional shape, and in which the thermoformed paint coat resembles the spray-painted metallic paint finish.

10. The process according to claim 8 including casting a clear coat on a carrier, drying the clear coat, and thereafter casting a base coat comprising the dispersion on the dried clear coat to form a base coat/clear coat composite paint coat, the base coat/clear coat composite having a distinctness-of-image (DOI) greater than about 60.

11. The process according to claim 10 including thermoforming the base coat/clear coat composite paint coat, and in which the thermoformed composite undergoes elongation during thermoforming while retaining a DOI of greater than 60 and while resembling the spray-painted metallic automotive finish.

12. The process according to claim 8 in which the melt viscosity of the PVDF copolymer is less than about 20,000 poise at 230° C.

13. The process according to claim 12 in which said melt viscosity is in the range of 17,000 to 20,000 poise at 230° C.

14. The process according to claim 8 in which the reflectance for the paint coat as measured by the Travel Index test is within an average of 5% of the reflectance for the spray-painted metallic paint finish when the paint coat and the spray-painted metallic paint finish are viewed at different viewing angles in the range from about 15° to about 110°.

15. The process according to claim 14 in which the PVDF copolymer has a mean particle size of less than about 4.5 microns.

16. The process according to claim 8 in which the PVDF copolymer has a mean particle size below about 6.5 microns.

17. The process according to claim 8 in which the ratio of PVDF to acrylic resin is from about 25% to 70% PVDF and from about 30% to 75% acrylic resin, respectively, by weight of the total solids contained in the dispersion.

18. The process according to claim 8 in which the paint coat is cast by coating the paint coat onto the supporting surface in the absence of spray painting.

19. The process according to claim 8 in which the PVDF copolymer comprises a PVDF copolymer having a mean particle size distribution range from about 3 to about 4.5 microns.

20. A process for controlling the metallic appearance of a metallic automotive paint film containing reflective flakes to achieve a random orientation of the reflective flakes, the process comprising:

coating a layer of a thermoplastic and thermoformable pigment-containing metallic automotive paint coat onto a carrier by roll coating techniques;

the paint coat comprising a dispersion of a polyvinylidene fluoride material in a solvent-based solution of an acrylic resin, the dispersed polyvinylidene fluoride material having a mean particle size distribution range from about 3 to about 6.5 microns and being uniformly dispersed in the solution of acrylic resin, the paint coat further comprising a pigment uniformly dispersed in the paint coat to provide coloration, and reflective flakes uniformly dispersed in the paint to coat to impart to the paint film a metallic appearance; and drying the paint coat to fuse the paint coat and thereby form a finished metallic automotive paint film in which the parallel orientation of the reflective flakes to one another is inhibited such that the flake orientation of the finished paint film provides a randomly oriented distribution of the reflective flakes.

21. The process according to claim 20 in which the paint coat is applied to the carrier by roll-coating techniques which include knife over roll, slot die coating or reverse roll coating.

22. The process according to claim 20 including coating a clear coat on the carrier, drying the clear coat, and thereafter casting a base coat comprising the dispersion on the dried clear coat to form a base coat/clear coat composite paint coat, the base coat/clear coat composite having a distinctness-of-image greater than about 60.

23. The process according to claim 20 in which the reflectance of the dispersed form of the metallic paint coat is within an average of 5% of the reflectance for a spray-painted form of the same metallic automotive paint coat when the dispersed form and the spray-painted form of the metallic paint coats are both viewed at different viewing angles in the range from about 15° to about 110°.

24. The process according to claim 20 in which the ratio of PVDF to acrylic resin is from about 25% to about 70% PVDF and from about 30% to about 75% acrylic resin, respectively, by weight of the total solids contained in the dispersion.

25. The process according to claim 20 in which the finished paint film has a Travel Index substantially the same as the Travel Index for a fused spray-painted coat of the same color of metallic automotive paint when viewed at different viewing angles.

26. The process according to claim 1 in which a fine particulate inert filler material is dispersed in the paint coat in an amount less than about 2% by weight of the solids contained in the paint coat for increasing light scattering at face and flop angles of the finished paint film.

27. The process according to claim 26 in which the fine particulate inert filler comprises silica with a mean particle size of about 3 microns.

28. The process according to claim 8 in which a fine particulate inert filler material present in an amount less than about 2% by weight of the solids contained in the paint coat for increasing light scatter at face and flop angles of the finished paint film.

29. The process according to claim 28 in which the fine particulate inert filler comprises silica with a mean particle size of about 3 microns.

30. The process according to claim 20 in which a fine particulate inert filler material present in an amount less than about 2% by weight of the solids contained in the paint coat for increasing light scatter at face and flop angles of the finished paint film.

31. The process according to claim 30 in which the fine particulate inert filler comprises silica with a mean particle size of about 3 microns.

32. The process according to claim 20 in which the polyvinylidene fluoride is milled to said particle size in a fluidized bed/classifier apparatus.

33. The process according to claim 1 in which the mean particle size is in the range from about 3 to about 6.5 microns.

* * * * *